(12) United States Patent
Shitagami et al.

(10) Patent No.: US 9,958,753 B2
(45) Date of Patent: May 1, 2018

(54) ELECTROPHORESIS DISPERSION LIQUID

(71) Applicant: SEIKO EPSON CORPORATION, Tokyo (JP)

(72) Inventors: Kozo Shitagami, Chino (JP); Hiroki Nakahara, Shiojiri (JP); Harunobu Komatsu, Matsumoto (JP); Takashi Hiraiwa, Fujimi-machi (JP); Masahiko Nakazawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/425,524

(22) Filed: Feb. 6, 2017

(65) Prior Publication Data

US 2017/0235205 A1    Aug. 17, 2017

(30) Foreign Application Priority Data

Feb. 17, 2016  (JP) ................. 2016-028008

(51) Int. Cl.
| | |
|---|---|
| G02B 26/00 | (2006.01) |
| G02B 26/08 | (2006.01) |
| G02F 1/29 | (2006.01) |
| G02F 1/167 | (2006.01) |
| C08F 297/00 | (2006.01) |
| C08F 290/06 | (2006.01) |
| C08F 293/00 | (2006.01) |

(52) U.S. Cl.
CPC .......... *G02F 1/167* (2013.01); *C08F 290/068* (2013.01); *C08F 293/005* (2013.01); *C08F 297/00* (2013.01); *C08F 2438/03* (2013.01); *C08F 2810/40* (2013.01); *G02F 2001/1678* (2013.01)

(58) Field of Classification Search
CPC ............ G02F 1/167; G02F 2001/1678; G02F 1/0009; G02F 1/172; G02F 2001/094; G02F 1/0147; G02F 1/09; G02F 1/1393; G02F 1/1506; G02F 1/1508; G02F 2001/1672; G02F 2202/38; G02F 1/133553; G02F 2202/022; G02F 2202/36
USPC ............... 359/237, 242, 265–267, 270–273, 359/290–292, 298, 296, 315, 321, 322
See application file for complete search history.

(56) References Cited

U.S. PATENT DOCUMENTS

2005/0270628 A1* 12/2005 Miyazaki ................. B01J 13/14
359/296
2014/0240815 A1   8/2014 Kayashima et al.

FOREIGN PATENT DOCUMENTS

| JP | 2010-191055 A | 9/2010 |
|---|---|---|
| JP | 2011-070022 A | 4/2011 |
| JP | 2014-071151 A | 4/2014 |
| JP | 2014-167563 A | 9/2014 |

(Continued)

*Primary Examiner* — Brandi Thomas
(74) *Attorney, Agent, or Firm* — Oliff PLC

(57) ABSTRACT

An electrophoresis dispersion liquid according to the aspect of the invention contains at least one type of electrophoretic particles and a dispersion medium and, in the electrophoresis dispersion liquid, the content of the electrophoretic particles is 10 weight % or more to 30 weight % or less. Furthermore, the electrophoretic particles have base particles and a polymer (particle surface treatment agent) linked with the base particles and, in the electrophoretic particles, the content of the polymer is 5 weight % or more to 15 weight % or less.

20 Claims, 7 Drawing Sheets

(56) References Cited

FOREIGN PATENT DOCUMENTS

JP 2015-055860 A 3/2015

* cited by examiner

ELECTROPHORESIS DISPERSION LIQUID

BACKGROUND

1. Technical Field

The present invention relates to an electrophoresis dispersion liquid, an electrophoresis sheet, an electrophoresis device, and an electronic apparatus.

2. Related Art

In general, it is known that when an electric field acts on a dispersion system in which fine particles are dispersed in a liquid, the fine particles move (migrate) in the liquid due to Coulomb force. This phenomenon is referred to as electrophoresis and, in recent years, an electrophoresis display device where the desired information (image) is displayed using electrophoresis has attracted attention as a new display device.

The electrophoresis display device has characteristics such as having a display memory property in a state where the application of voltage is stopped, a wide viewing angle, and a high contrast display performance with low power consumption.

In addition, the electrophoresis display device is a non-emissive type device which also has a characteristic of being better for the eyes in comparison with emission type display devices such as cathode ray tubes.

Such electrophoresis display devices are known to include a device which is provided with a liquid in which electrophoretic particles are dispersed in a dispersion medium as an electrophoresis dispersion liquid arranged between a pair of substrates which have electrodes.

In the electrophoresis dispersion liquid formed in this manner, particles including particles with a positive charge property and particles with a negative charge property are used as the electrophoretic particles, due to this, it is possible to display the desired information (image) by applying a voltage between the pair of substrates (electrodes).

In general, particles provided with a coating layer where a polymer is linked with respect to a substrate particle are used as the above electrophoretic particles and forming the particles to be provided with the coating layer (polymer) in this manner makes possible to disperse and charge the electrophoretic particles in the electrophoresis dispersion liquid (for example, refer to JP-A-2015-055860).

In an electrophoresis display device provided with an electrophoresis dispersion liquid as described above, high reflectivity characteristics and fast display characteristics are important display characteristics. However, for example, in JP-A-2015-055860, in order to obtain excellent white reflectivity when displaying white, the content of the electrophoretic particles in the electrophoresis dispersion liquid is approximately 40 weight %. However, although it is possible to obtain excellent white reflectivity under the condition of such a high particle content, the volume occupied by the electrophoretic particles is increased and the viscosity of the electrophoresis dispersion liquid is increased as a result. Therefore, during migration of the electrophoretic particles when changing the image, resistance is generated by the contact between the electrophoretic particles and, as a result, there is a problem in that the display speed of the images is reduced. That is, in the electrophoresis display device, high reflectivity characteristics and fast display characteristics are opposing display characteristics.

SUMMARY

An advantage of some aspects of the invention is to provide an electrophoresis dispersion liquid which is able to realize an electrophoresis display device which exhibits both high reflectivity characteristics and fast display characteristics, a highly reliable electrophoresis sheet, an electrophoresis device, and an electronic apparatus which exhibit both high reflectivity characteristics and fast display characteristics and which are provided with the electrophoresis dispersion liquid.

This advantage is achieved by aspects of the invention described below.

According to an aspect of the invention, there is provided an electrophoresis dispersion liquid including at least one type of electrophoretic particles, and a dispersion medium, in which, in the electrophoresis dispersion liquid, content of the electrophoretic particles is 10 weight % or more to 30 weight % or less, the electrophoretic particles have base particles and a particle surface treatment agent linking with the base particles, and content of the particle surface treatment agent in the electrophoretic particles is 5 weight % or more to 15 weight % or less.

Due to this, it is possible for an electrophoresis display device provided with the electrophoresis dispersion liquid to exhibit both high reflectivity characteristics and fast display characteristics.

In the electrophoresis dispersion liquid according to the aspect of the invention, an average particle diameter of the base particles is preferably 50 nm or more to 400 nm or less.

Electrophoretic particles provided with base particles having an average particle diameter in such a range exhibit an excellent dispersibility and electrophoretic property.

In the electrophoresis dispersion liquid according to the aspect of the invention, it is preferable that the base particles be provided with a hydroxyl group on a surface, the particle surface treatment agent be provided with a dispersion portion derived from a first monomer and a bonding portion derived from a second monomer having a functional group, in the bonding portion, there be a siloxane-based compound formed of a block copolymer linked with the base particles by reacting the functional group and the hydroxyl group, and the first monomer be a silicone macromonomer which is represented by General Formula (I)

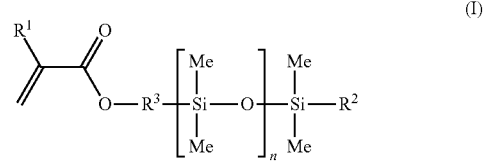

[In the formula, $R^1$ represents a hydrogen atom or a methyl group, $R^2$ represents a hydrogen atom or an alkyl group having 1 to 4 carbon atoms, $R^3$ represents a structure which includes one type out of an alkyl group having 1 to 6 carbon atoms and an ether group of ethylene oxide or propylene oxide, and n represents an integer of 0 or more.]

Due to this, the formed dispersion portion exhibits excellent affinity with respect to the silicone oil used as the dispersion medium included in the electrophoresis dispersion liquid. Therefore, in the electrophoresis dispersion liquid, the electrophoretic particles provided with the dispersion portion are dispersed while having an excellent dispersibility without aggregation.

In the electrophoresis dispersion liquid according to the aspect of the invention, the weight average molecular weight of the dispersion portion is preferably 15,000 or more to 150,000 or less.

Due to this, it is possible for the dispersion portion derived from a first monomer provided with a pendant type structure to exhibit excellent affinity with respect to silicone oil used as the dispersion medium included the electrophoresis dispersion liquid. Therefore, in the electrophoresis dispersion liquid, it is possible to disperse the electrophoretic particles provided with the dispersion portion while having an excellent dispersibility without aggregation or being fixed with respect to the electrode surface.

In the electrophoresis dispersion liquid according to the aspect of the invention, in the dispersion portion, the number of units derived from the first monomer is preferably one.

Due to this, it is possible to make the dispersibility of the electrophoretic particles in the electrophoresis dispersion liquid more reliably excellent.

According to another aspect of the invention, there is provided an electrophoresis dispersion liquid including first electrophoretic particles, second electrophoretic particles with a smaller particle diameter than the first electrophoretic particles, and a dispersion medium, in which, in the electrophoresis dispersion liquid, a total content of the first electrophoretic particles and the second electrophoretic particles is 10 weight % or more to 30 weight % or less, the first electrophoretic particles have first base particles and a first particle surface treatment agent linked with the first base particles, a content of the first particle surface treatment agent in the first electrophoretic particles is 5 weight % or more to less than 10 weight %, the second electrophoretic particles have second base particles and a second particle surface treatment agent linked with the second base particles, and a content of the second particle surface treatment agent in the second electrophoretic particles is 10 weight % or more to 15 weight % or less.

Due to this, it is possible for an electrophoresis display device provided with the electrophoresis dispersion liquid to exhibit both high reflectivity characteristics and fast display characteristics.

In the electrophoresis dispersion liquid according to the aspect of the invention, it is preferable that an average particle diameter of the first base particles be 200 nm or more to 400 nm or less, and an average particle diameter of the second base particles be 50 nm or more to less than 200 nm.

The electrophoresis dispersion liquid according to the aspect of the invention is suitably applied to an electrophoresis dispersion liquid which contains the first electrophoretic particles and the second electrophoretic particles with this composition.

In the electrophoresis dispersion liquid according to the aspect of the invention, it is preferable that the first electrophoretic particles be charged positively and the second electrophoretic particles be charged negatively.

The electrophoresis dispersion liquid according to the aspect of the invention is suitably applied to an electrophoresis dispersion liquid which contains the first electrophoretic particles and the second electrophoretic particles with this composition.

In the electrophoresis dispersion liquid according to the aspect of the invention, it is preferable that the first electrophoretic particles be white particles and the second electrophoretic particles be colored particles.

The electrophoresis dispersion liquid according to the aspect of the invention is suitably applied to an electrophoresis dispersion liquid which contains the first electrophoretic particles and the second electrophoretic particles with this composition.

In the electrophoresis dispersion liquid according to the aspect of the invention, it is preferable that, in the electrophoresis dispersion liquid, when content of the first electrophoretic particles is set as A "weight %" and content of the second electrophoretic particles is set as B "weight %", a ratio A/B of the content A and the content B satisfy a relationship of 10 or more to 20 or less.

Due to this, it is possible to more reliably obtain high reflectivity characteristics.

According to still another aspect of the invention, there is provided an electrophoresis sheet including a substrate, and a structural body which is provided on the substrate and which stores the electrophoresis dispersion liquid of the invention.

Due to this, it is possible to obtain an electrophoresis sheet with high performance and reliability.

According to still another aspect of the invention, there is provided an electrophoresis device including the electrophoresis sheet according to the aspect of the invention.

Due to this, it is possible to obtain an electrophoresis device with high performance and reliability.

According to still another aspect of the invention, there is provided an electronic apparatus including the electrophoresis device according to the aspect of the invention.

Due to this, it is possible to obtain an electronic apparatus with high performance and reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

A detailed description will be given below of the electrophoresis dispersion liquid, the electrophoresis sheet, the electrophoresis device, and the electronic apparatus according to aspects of the invention based on favorable embodiments shown in the accompanying drawings.

Electrophoresis Dispersion Liquid

The electrophoresis dispersion liquid contains at least one type of electrophoretic particles 1 and a dispersion medium (liquid phase dispersion medium) and, in the electrophoresis dispersion liquid, the electrophoretic particles 1 are dispersed (suspended) in the dispersion medium.

First, a description will be given of the electrophoretic particles 1 included in the electrophoresis dispersion liquid.

Electrophoretic Particles

Figure 1:
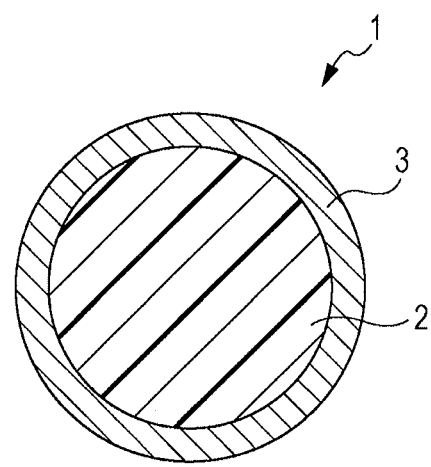
FIG. 1 is a longitudinal cross-sectional view which shows an embodiment of electrophoretic particles included in an electrophoresis dispersion liquid according to the aspect of the invention.
Figure 2:
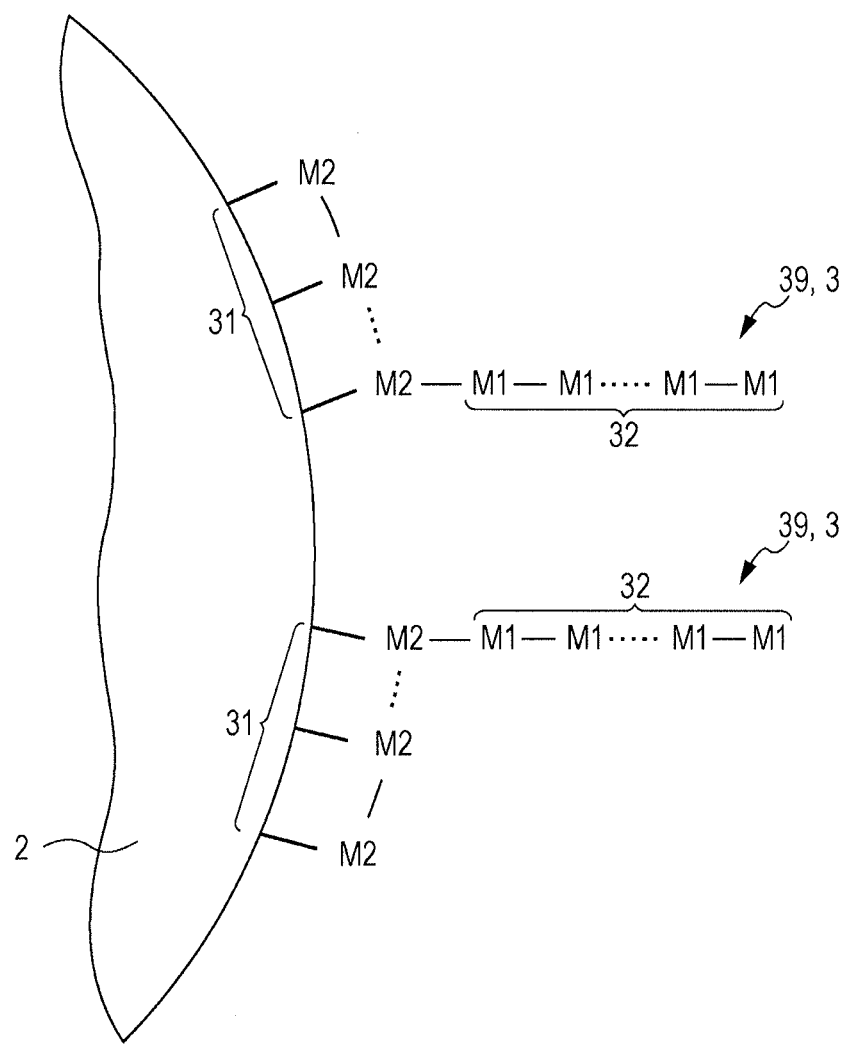
FIG. 2 is a schematic diagram of a block copolymer of the electrophoretic particles shown in FIG. 1.

FIG. 1 is a vertical cross-sectional view which shows an embodiment of electrophoretic particles included in the electrophoresis dispersion liquid according to the aspect of the invention and FIG. 2 is a schematic diagram of a block copolymer of the electrophoretic particles shown in FIG. 1.

As shown in FIG. 1, the electrophoretic particles 1 have base particles (particles) 2, and a coating layer 3 provided on the surface of the base particles 2.

In the base particles 2, at least one type out of, for example, pigment particles, resin particles, or composite particles thereof is suitably used. These particles are easy to manufacture.

Examples of the pigment forming the pigment particles include black pigments such as aniline black, carbon black, and titanium black, white pigments such as titanium dioxide (titania), antimony trioxide, barium sulfate, zinc sulfide, zinc white, and silicon dioxide, azo pigments such as monoazo, disazo, and polyazo, yellow pigments such as isoindolinone, chrome yellow, yellow iron oxide, cadmium yellow, titanium yellow, and antimony, red pigments such as quinacridone red, and chrome vermilion, blue pigments such as phthalocyanine blue, indanthrene blue, Prussian blue, ultramarine blue, and cobalt blue, green pigments such as phthalocyanine green, and the like, which may be used singly or in a combination of two or more types.

In addition, examples of the resin material forming the resin particles include acrylic resin, urethane-based resin, urea-based resin, epoxy-based resin, polystyrene, polyester, and the like, which may be used singly or in a combination of two or more types.

In addition, examples of the composite particles include composite particles coated and treated by coating the surface of the pigment particles with a resin material, composite particles coated and treated by coating the surface of resin particles with a pigment, composite particles formed by a mixture in which a pigment and a resin material are mixed at an appropriate composition ratio, and the like.

Here, it is possible to set the desired color of the electrophoretic particles 1 by appropriately selecting the type of the pigment particles, the resin particles, and the composite particles used as the base particles 2.

Furthermore, by this selection, it is possible to set the base particles 2 to be positively charged or negatively charged and also to set the charge amount to be specific to the base particles 2.

The average particle diameter of the base particles 2 is preferably 50 nm or more to 400 nm or less, and more preferably 100 nm or more to 300 nm or less. Since the electrophoretic particles 1 provided with the base particles 2 having an average particle diameter in the above range exhibit an excellent dispersibility and electrophoretic property, the average particle diameter of the base particles 2 is normally preferably set in the above range.

In addition, the specific surface area of the base particles 2 is preferably 5 $m^2/g$ or more to 50 $m^2/g$ or less, and more preferably 10 $m^2/g$ or more to 40 $m^2/g$ or less. Since the specific surface area of the base particles 2 having an average particle diameter in the above range is within this range, the electrophoretic particles 1 provided with the base particles 2 having the specific surface area in the above range exhibit an excellent dispersibility and electrophoretic property.

Here, it is necessary for the base particles 2 to be provided with a first functional group, which is able to bond (react) with a second functional group provided in a bonding portion 31 of a block copolymer 39 to be described below, on the surface thereof (to be exposed). However, since there may not be a functional group depending on the type of the pigment particles, the resin particles, and the composite particles, in such a case, a functional group introduction treatment such as an acid treatment, a basic treatment, a UV treatment, an ozone treatment, or a plasma treatment is carried out in advance to introduce a first functional group to the surface of the base particles 2.

In addition, the combination of the first functional group provided on the surface of the base particles 2 and the second functional group provided in the bonding portion 31 of the block copolymer 39 is not particularly limited as long as the groups are able to react and to link with each other and examples thereof include a combination of an isocyanate group and a hydroxyl group or an amino group, a combination of an epoxy group, a glycidyl group or an oxetane group and a carboxyl group, an amino group, a thiol group, a hydroxyl group, or an imidazole group, a combination of an amino group and a halogen group such as Cl, Br, and I, a combination of an alkoxysilyl group and a hydroxyl group or an alkoxysilyl group, and the like, and among these, a combination where the first functional group is a hydroxyl group and the second functional group is an alkoxysilyl group is preferable.

The base particles 2 and a monomer M2 forming this combination are preferably used as it is possible to carry out the preparation of each comparatively easily and it is possible to strongly link the monomer M2 (block copolymer to be described below) with the surface of the base particles 2.

Here, a description will be given below of an example of a combination where the first functional group provided on the surface of the base particles 2 is a hydroxyl group and the second functional group provided in the monomer M2 is an alkoxysilyl group.

At least a part (in the illustrated composition, almost the entirety thereof) of the surface of the base particles 2 is coated with the coating layer 3.

The coating layer 3 forms a composition which includes a plurality of block copolymers 39 (also referred to below as "polymer 39") (refer to FIG. 2).

The block copolymers 39 are provided with a dispersion portion 32 and the bonding portion 31 linking with the dispersion portion 32.

The dispersion portion 32 includes a unit (a constituent unit, also referred to below as a dispersion unit) derived from the first monomer M1 (also referred to below simply as "monomer M1") having a portion (group) contributing to the dispersibility in the dispersion medium.

In addition, the bonding portion 31 includes a plurality of units (also referred to below as bonding units) having reactivity with the hydroxyl group (the first functional group) of the base particle surface and derived from the second monomer M2 having an alkoxysilyl group (the second functional group). In the bonding portion 31, the base particles 2 and the block copolymer 39 are chemically bonded by the reaction of the hydroxyl group and the functional group.

In the present embodiment, the block copolymer 39 forms a particle surface treatment agent (coupling agent) used in the formation of the electrophoretic particles 1.

A description will be given below of the dispersion portion 32 and the bonding portion 31 forming the block copolymer 39.

The dispersion portion 32 is provided on the surface of the base particles 2 in the coating layer 3 in order to impart a dispersibility to the electrophoretic particles 1 in the electrophoresis dispersion liquid.

The dispersion portion 32 has a dispersion unit derived from the monomer M1 formed by the monomer M1 having a portion forming a side chain contributing to the dispersibility in the dispersion medium after polymerization in the electrophoresis dispersion liquid linking with the bonding portion 31 by polymerization of a plurality thereof or a single body.

The monomer M1 is provided with one polymerizable group so as to be able to polymerize or link with the linking unit provided in the bonding portion 31 to be described below by living radical polymerization (radical polymerization), and, furthermore, is a pendant type monofunctional monomer provided with a portion which forms a non-ionic side chain after the polymerization.

In the present embodiment, as the monomer M1, the silicone macromonomer represented by the following General Formula (I) provided with dimethyl polysiloxane as a non-ionic side chain, and provided with a (meth)acryloyl group as a polymerizable group is used. Using such a silicone macromonomer as the monomer M1 makes the block copolymer 39 impart a function as a siloxane-based compound.

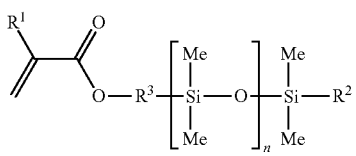

(I)

[In the formula, $R^1$ represents a hydrogen atom or a methyl group, $R^2$ represents a hydrogen atom or an alkyl group having 1 to 4 carbon atoms, $R^3$ represents a structure which includes one type out of an alkyl group having 1 to 6 carbon atoms and an ether group of ethylene oxide or propylene oxide, and n represents an integer of 0 or more.]

By using the silicone macromonomer provided with such a non-ionic side chain as the monomer M1, the formed dispersion portion 32 exhibits an excellent affinity with respect to the silicone oil which is used as the dispersion medium included in the electrophoresis dispersion liquid to be described below. Therefore, in the electrophoresis dispersion liquid, the electrophoretic particles 1 provided with the dispersion portion 32 are dispersed while having an excellent dispersibility without aggregation. In addition, by using the monomer M1 provided with a (meth)acryloyl group as a polymerizable group, since it is possible to polymerize the monomer M1 with an excellent reactivity with respect to itself or the polymerization portion derived from the monomer M2 provided in the bonding portion 31, it is possible to easily obtain the dispersion portion 32.

The weight average molecular weight of the dispersion portion 32 is preferably 15,000 or more to 150,000 or less, more preferably 16,000 or more to 100,000 or less, and even more preferably 18,000 or more to 50,000 or less. Due to this, the dispersion portion 32 derived from the monomer M1 (siloxane-based compound) provided with a pendant type structure is able to exhibit an excellent affinity with respect to the silicone oil used as the dispersion medium included in the electrophoresis dispersion liquid to be described below. Therefore, in the electrophoresis dispersion liquid, the electrophoretic particles 1 provided with the dispersion portion 32 are able to be dispersed with an excellent dispersibility without aggregating or being fixed to the electrode surface. As a result, the electrophoresis device obtained using the electrophoresis dispersion liquid is able to exhibit excellent contrast (reflectivity characteristics). Here, when the weight average molecular weight is less than the lower limit value, there is a concern that it will no longer be possible to impart an excellent dispersibility with respect to the electrophoretic particles 1 in the electrophoresis dispersion liquid depending on the type of the monomer M1. Furthermore, when the weight average molecular weight exceeds the upper limit value, there is a concern that the productivity will decrease depending on the type of the monomer M1.

In addition, in one polymer, the number of dispersion units included in the dispersion portion 32 is preferably 1 or more to 20 or less, more preferably 1 or more to 5 or less, and even more preferably 1. Due to this, it is possible to make the dispersibility of the electrophoretic particles 1 in the electrophoresis dispersion liquid more reliably excellent.

Here, the weight average molecular weight of the monomer M1 (silicone macromonomer) is appropriately set according to the weight average molecular weight of the dispersion portion 32 and the number of dispersion units included in the dispersion portion 32 to be formed as described above.

In addition, molecular weight distribution of the dispersion portion 32 is preferably 1.2 or less, more preferably 1.1 or less, and even more preferably 1.05 or less.

Here, the molecular weight distribution of the dispersion portion 32 represents the ratio (Mw/Mn) between the number average molecular weight (Mn) of the dispersion portion 32 and the weight average molecular weight (Mw) of the dispersion portion 32 and, by the molecular weight distribution of the dispersion portion 32 being in this range, it may be said that the dispersion portions 32 exposed in the plurality of electrophoretic particles 1 are formed with an almost uniform length. Therefore, in the electrophoresis dispersion liquid, each of the electrophoretic particles 1 exhibits a uniform dispersibility. It is possible to measure the number average molecular weight (Mn) and the weight average molecular weight (Mw) as the polystyrene conversion molecular weight using, for example, gel permeation chromatography (GPC).

The bonding portion 31 bonds with the surface of the base particles 2 in the coating layer 3 of the electrophoretic particles 1, due to this, the polymer 39 is linked with the base particles 2.

The bonding portion 31 is able to form a covalent bond by the reaction of the base particles 2 with the hydroxyl group provided on the surface thereof, is formed by polymerizing two or more (a plurality) of the second monomers M2 which have an alkoxysilyl group (functional group), and two or more (a plurality) of the bonding units (constituent units) derived from the monomer M2 are continuous.

In this manner, by using the polymer 39 provided with the bonding portion 31 having a plurality of bonding units each having the second functional group, it is possible to make the dispersibility of the electrophoretic particles 1 excellent. That is, the polymer 39 not only includes a plurality of second functional groups, but a plurality of the second functional groups are also present concentrated in the bonding portion 31. Furthermore, since the bonding portion 31 links a plurality of bonding units, in comparison with a case where there is only one bonding unit (for example, a coupling agent of the related art), the portion which is able to react with the base particles 2 is large. Therefore, in the bonding portion 31 formed by polymerizing a plurality of monomers M2, it is possible to reliably bond the polymer 39 to the surface of the base particles 2.

Here, in the present embodiment, as described above, a hydroxyl group is provided on the surface of the base particles 2 as the first functional group and the second functional group of the monomer M2 is an alkoxysilyl group. Since combining a hydroxyl group and an alkoxysilyl group in this manner makes the reaction therebetween exhibit excellent reactivity, it is possible to more reliably form a bond with the surface of the base particles 2 in the bonding portion 31. That is, it is possible to more reliably impart a function as a coupling agent linking with the surface of the base particles 2 to the polymer 39.

The monomer M2 is provided with one alkoxysilyl group represented by the following General Formula (II) as the second functional group and is also provided with one polymerizable group so as to be able to carry out polymerization by living radical polymerization.

[In the formula, R each independently represents an alkyl group having 1 to 4 carbon atoms and n represents an integer of 1 to 3.]

By using a monomer formed as above as the monomer M2, it is possible to set the bonding portion 31 where the monomer M2 is polymerized by living radical polymerization, and the bonding portion 31 formed by living radical polymerization exhibits excellent reactivity with respect to the hydroxyl group positioned on the surface of the base particles 2.

In addition, examples of one polymerizable group of the monomer M2 include carbon-carbon double bonds such as a vinyl group, a styryl group, and a (meth)acryloyl group.

Examples of such monomers M2 include vinyl monomers, vinyl ester monomers, vinyl amide monomers, (meth)acrylic monomers, (meth)acrylic ester monomers, (meth)acrylamide monomers, styryl monomers, and the like each provided with one alkoxysilyl group represented by the above General Formula (II), more specifically, examples thereof include silane-based monomers which contain silicon atoms such as 3-(meth)acryloxypropyltriethoxy(methoxy)silane, vinyltriethoxy(methoxy)silane, 4-vinylbutyltriethoxy(methoxy)silane, 8-vinyloctyltriethoxy(methoxy) silane, 10-methacryloyloxydecyltriethoxy(methoxy)silane, 10 acryloyloxydecyltriethoxy(methoxy) silane, and it is possible to use one type or two or more type of the above in combination.

In addition, in one polymer, the number of linking units included in the bonding portion 31 may be 2 or more, but 2 or more to 15 or less is preferable, and 3 or more to 10 or less is more preferable. When the number exceeds the upper limit value, since the bonding portion 31 has a low affinity with the dispersion medium in comparison with the dispersion portion 32, depending on the type of the monomer M2, there is a concern that the dispersibility of the electrophoretic particles 1 may be decreased and the bonding portions 31 may partially react with each other. In addition, when the number is less than the lower limit value, depending on the type of the monomer M2, it is not possible to sufficiently proceed with the bonding with the base particles 2, and there is a concern that the dispersibility of the electrophoretic particles 1 may be decreased as a result.

In addition, it is possible to determine the number of bonding units included in the bonding portion 31 by analysis using a general-purpose analytical instrument using an NMR spectrometer, an IR spectrophotometer, elemental analysis, gel permeation chromatography (GPC), or the like. Here, in the polymer 39, since the bonding portion 31 is a polymer, there is a certain molecular weight distribution. Accordingly, the results of the analysis described above do not necessarily apply to all of the polymer 39; however, if the number of the bonding units determined by the method described above is at least 2 to 10, it is possible to satisfy both of the reactivity between the polymer 39 and the base particles 2 and the dispersibility and the electrophoretic property (charging property) of the electrophoretic particles 1.

It is possible to obtain the polymer 39 using a manufacturing method to be described below. For example, when using reversible addition-fragmentation chain transfer polymerization (RAFT), which will be described below, it is possible to obtain a comparatively uniform polymer. Accordingly, when polymerization is carried out by adding 2 to 10 molar equivalents of the monomer M2 with respect to the chain transfer agent, it is possible to set the number of bonding units in the bonding portion 31 to the range described above. In a case where the addition ratio of the monomer M2 is 100% or less, taking this into consideration, the polymerization reaction may be performed by setting the added amount of the monomer M2 to be 2 to 10 molar equivalents or more.

Here, after generating the dispersion portion 32, in a case where the bonding portion is generated, the dispersion portion 32 acts as a chain transfer agent. In such a case, for example, the weight average molecular weight and the number average molecular weight of the polymer forming the dispersion portion 32 may be determined using a GPC method and the added amount of the monomer M2 may be determined based thereon.

Due to this, it is possible to make the electrophoretic particles 1 reliably exhibit an effect through the composition provided with the polymer 39, and the electrophoretic particles 1 have an excellent dispersibility in the electrophoresis dispersion liquid.

The polymer 39 (particle surface treatment agent) provided with the dispersion portion 32 and the bonding portion 31 is linked with at least a part of the surface of the base particles 2 and forms the coating layer 3; however, in the invention, when the weight of the electrophoretic particles 1 is set to 100 weight %, the weight of the polymer (particle surface treatment agent) 39 is 5 weight % or more to 15 weight % or less. That is, in the electrophoretic particles 1, the content of the polymer 39 is 5 weight % or more to 15 weight % or less. When the weight of the polymer 39 linked with the base particles 2 is less than the lower limit value, the effect obtained by linking the polymer 39 with the base particles 2 is not sufficiently obtained and it is no longer possible to sufficiently disperse the electrophoretic particles 1 in the electrophoresis dispersion liquid. In addition, when the weight of the polymer 39 linked with the base particles 2 exceeds the upper limit value, the weight of the electrophoretic particles 1 as a whole increases and, from this point of view, it is no longer possible to sufficiently disperse the electrophoretic particles 1 in the electrophoresis dispersion liquid. From the above, aggregation of the positive and negative electrophoretic particles, fixation to the electrode surface, or the like are seen and, as a result, there is a problem in that decreases in the contrast, changes over time in the contrast, or the like are caused. In contrast, by setting the weight of the polymer 39 linked with the base particles 2 to be within this range, since it is possible to sufficiently disperse the electrophoretic particles 1 in the electrophoresis dispersion liquid, it is possible to reliably suppress or prevent aggregation of the positive and negative electrophoretic particles, fixation to the electrode surface, or the like. As a result, it is possible to make the electrophoresis display device provided with the electrophoresis dispersion liquid according to the aspect of the invention exhibit excellent contrast, that is, high reflectivity characteristics.

Here, manufacturing the electrophoretic particles 1 by applying the method of manufacturing electrophoretic particles to be described below makes it possible to link the polymer 39 with respect to the base particles 2 having the average particle diameter (specific surface area) described above at a high coating weight (coating ratio) such as the above range; however, a description thereof will be given below.

Furthermore, in the invention, as described above, the polymer 39 linked with the surface of the base particles 2 has a content of 5 weight % or more to 15 weight % or less in the electrophoretic particles 1 and, due to this, it is possible to disperse the electrophoretic particles 1 with an excellent dispersibility in the electrophoresis dispersion liquid. Therefore, it is possible to display information (an image) even using a comparatively small amount of the electrophoretic particles 1, specifically, even when the content of the electrophoretic particles 1 is 10 weight % or more to 30 weight % or less in the electrophoresis dispersion liquid. As a result, the volume occupied by the electrophoretic particles 1 is reduced in the electrophoresis dispersion liquid and it is possible to reliably suppress or prevent increases in the viscosity of the electrophoresis dispersion liquid. Accordingly, it is possible to display images with an excellent display speed during the electrophoresis of the electrophoretic particles 1 since a lowering of the resistance due to contact between the electrophoretic particles is achieved. That is, it is possible for the electrophoresis display device provided with the electrophoresis dispersion liquid to exhibit fast display characteristics. Therefore, since it is possible to lower the driving voltage of the electrophoresis display device, it is possible to make an electrophoresis display device where the power consumption is reduced.

In addition, the weight of the polymer (particle surface treatment agent) 39 may be 5 weight % or more to 15 weight % or less with respect to 100 weight % of the electrophoretic particles 1; however, 4 weight % or more to 8 weight % or less is preferable, and 4.8 weight % or more to 6 weight % or less is more preferable. Due to this, in the electrophoresis dispersion liquid, it is possible to more uniformly disperse the electrophoretic particles 1 and it is possible to more reliably suppress or prevent aggregation between the positive or negative electrophoretic particles or fixation to the electrode surface, or the like being seen, thus it is possible to achieve an improvement in the contrast.

Furthermore, the content of the electrophoretic particles 1 in the electrophoresis dispersion liquid may be 10 weight % or more to 30 weight % or less; however, 15 weight % or more to 30 weight % or less is preferable, and 20 weight % or more to 30 weight % or less is more preferable. Due to this, the resistance due to contact between the electrophoretic particles during the electrophoresis of the electrophoretic particles 1 is more reliably lowered and, as a result, it is possible to display images with an excellent display speed.

In addition, it is possible to set the electrophoretic particles 1 to have the desired color and a positive or negative charge as described above by appropriately selecting the type of the base particles 2, and a plurality of types of particles with different colors and positive or negative charges may be included in the electrophoresis dispersion liquid.

As will be described in detail in an electrophoresis display device 920 to be described below, examples thereof include particles containing positively charged white particles 95a and negatively charged colored particles 95b as the electrophoretic particles 1 included in the electrophoresis dispersion liquid. By combining the electrophoretic particles 1 in this manner, a white display where the white particles 95a are seen and a color display (black display) where the colored particles 95b are seen are realized by switching the positive and negative potential which is applied between electrodes 93 and 94.

In the combination of the electrophoretic particles 1 including the white particles 95a (the first electrophoretic particles) and the colored particles 95b (the second electrophoretic particles), in order to obtain high reflectivity characteristics, specifically, in order to set the white reflectivity to 40% or more when making a white display and the black reflectivity to 5% or less when making a black display, the particle diameter of the white particles 95a is set to be large and, in addition, the particle diameter of the colored particles 95b is set to be smaller than that of the white particles 95a.

That is, the average particle diameter of the base particles 2 (the first base particles) of the white particles 95a is preferably set to 200 nm or more to 400 nm or less, and more preferably 200 nm or more to 300 nm or less, and, in addition, the average particle diameter of the base particles 2 (the second base particles) of the colored particles 95b is preferably set to 50 nm or more to less than 200 nm, and more preferably 100 nm or more to less than 200 nm.

Here, in such a case, the specific surface area of the base particles 2 (the first base particles) of the white particles 95a is preferably set to 5 $m^2/g$ or more to 25 $m^2/g$ or less, and more preferably set to 10 $m^2/g$ or more to 25 $m^2/g$ or less, in addition, the specific surface area of the base particles 2 (the second base particles) of the colored particles 95b is preferably set to 25 $m^2/g$ or more to 50 $m^2/g$ or less, and more preferably set to 25 $m^2/g$ or more to 40 $m^2/g$ or less.

In a case where the electrophoretic particles 1 are a combination of the white particles 95a (the first electrophoretic particles) and the colored particles 95b (the second electrophoretic particles), in the invention, the content of the polymer 39 (the first particle surface treatment agent) in the white particles 95a (the first electrophoretic particles) is 5 weight % or more to less than 10 weight %, and the content of the polymer 39 (the second particle surface treatment agent) in the colored particles 95b (the second electrophoretic particles) is 10 weight % or more to 15 weight % or less. Setting the content of the polymer 39 in the particles 95a and 95b having the respective average particle diameters in these ranges makes it possible to set the white particles 95a and the colored particles 95b to have an excellent dispersibility. As a result, it is possible for the electrophoresis display device provided with the electrophoresis dispersion liquid to exhibit excellent contrast, that is, high reflectivity characteristics.

Here, manufacturing the electrophoretic particles 1 by applying the method of manufacturing electrophoretic particles to be described below makes it possible to link the polymer 39 with respect to the base particles 2 having the average particle diameter (specific surface area) described above at a high coating weight (coating ratio) such as the above range; however, a description thereof will be given below.

Furthermore, in the invention, as described above, the content of the polymer 39 (the first particle surface treatment agent) in the white particles 95*a* (the first electrophoretic particles) is 5 weight % or more to less than 10 weight % and the content of the polymer 39 (the second particle surface treatment agent) in the colored particles 95*b* (the second electrophoretic particles) is 10 weight % or more to 15 weight % or less and, due to this, it is possible to disperse the electrophoretic particles 1 in the electrophoresis dispersion liquid with an excellent dispersion. Therefore, it is possible to display information (images) even with comparatively small amounts of the white particles 95*a* and the colored particles 95*b*, specifically, even when the total content of the white particles 95*a* and the colored particles 95*b* in the electrophoresis dispersion liquid is set to 10 weight % or more to 30 weight % or less. As a result, the volume occupied by the white particles 95*a* and the colored particles 95*b* in the electrophoresis dispersion liquid is reduced and it is possible to reliably suppress or prevent increases in the viscosity of the electrophoresis dispersion liquid. Accordingly, since the resistance due to contact between the white particles 95*a* and the colored particles 95*b* during electrophoresis of the white particles 95*a* and the colored particles 95*b* is lowered, it is possible to display images with an excellent display speed. That is, it is possible for the electrophoresis display device provided with the electrophoresis dispersion liquid to exhibit fast display characteristics.

In addition, in the combination of the electrophoretic particles 1 including the white particles 95*a* and the colored particles 95*b*, in the electrophoresis dispersion liquid, the ratio A/B of the content A [weight %] of the white particles 95*a* and the content B [weight %] of the colored particles 95*b* is preferably 10 or more to 20 or less, and more preferably 10 or more to 15 or less. Due to this, it is possible to more reliably obtain high reflectivity characteristics, that is, to more reliably set the white reflectivity to 40% or more when displaying white and more reliably set the black reflectivity to 5% or less when displaying black.

Here, a description was given above of a combination which contains the positively charged white particles 95*a* and the negatively charged colored particles 95*b* as the electrophoretic particles 1 included in the electrophoresis dispersion liquid; however, as a combination of two types of color electrophoretic particles 1, there may be, for example, a combination of two types of colored particles 95*b* having different colors in addition to the combination of the white particles 95*a* and the colored particles 95*b*.

Furthermore, in the described above, the white particles 95*a* were positively charged and the colored particles 95*b* were negatively charged; however, the white particles 95*a* may be negatively charged and the colored particles 95*b* may be positively charged.

The electrophoretic particles 1 forming the composition described above are dispersed (suspended) in a dispersion medium (liquid phase dispersion medium) in the electrophoresis dispersion liquid.

Dispersion Medium

In the present embodiment, a dispersion medium where silicone oil is the main component is used as this dispersion medium. Since the silicone oil exhibits excellent affinity with respect to the dispersion portion 32 formed using the silicone macromonomer described above as the monomer M1, silicone oil may be used as the dispersion medium.

Figure 4:
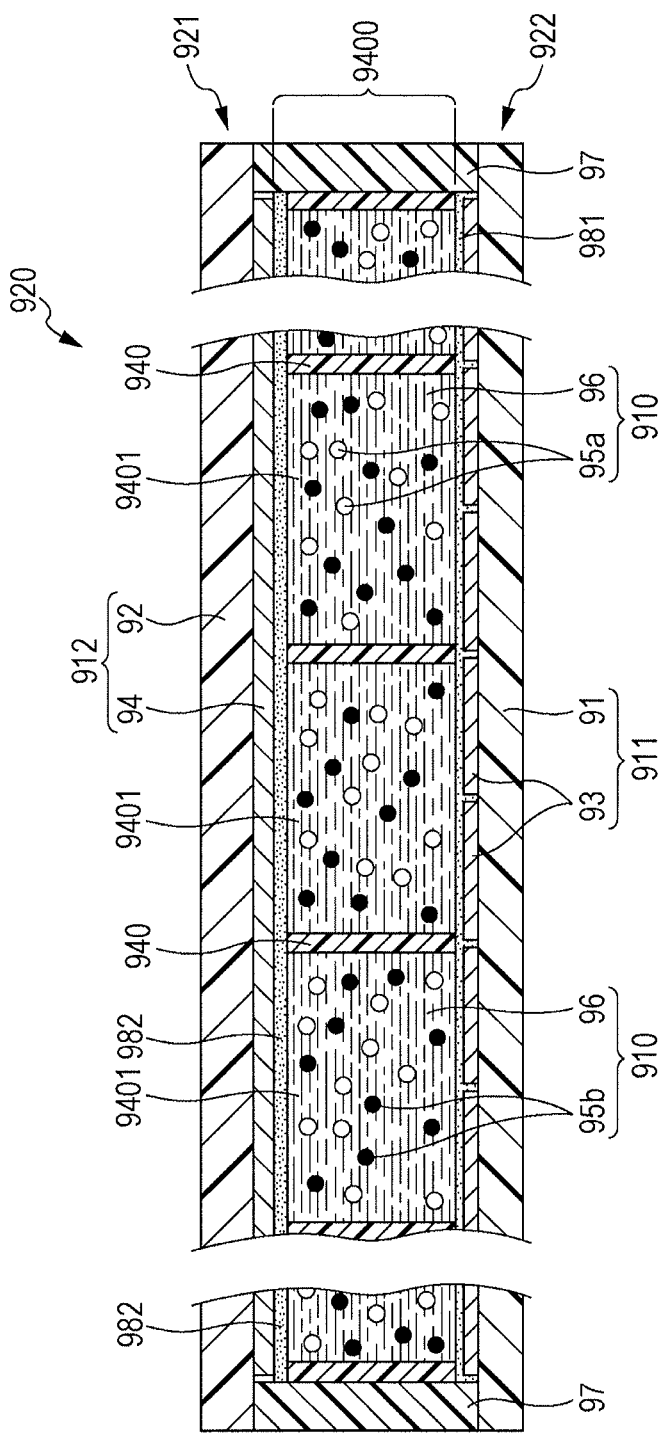
FIG. 4 is a diagram which schematically shows a longitudinal cross-section of an embodiment of an electrophoresis display device.

Due to this, since the aggregation suppression effect of the electrophoretic particles 1 is increased, it is possible to suppress the display performance of the electrophoresis display device 920 shown in FIG. 4 from deteriorating over time. In addition, silicone oil has advantages in that the weather resistance is excellent due to not having an unsaturated bond and the safety is also good.

Furthermore, the silicone oil (dispersion medium) preferably has a viscosity at room temperature (25° C.) of 5 cs or less, and more preferably 2 cs or more to 4 cs or less. Even when the viscosity of the silicone oil (dispersion medium) is in this range, with electrophoretic particles 1 provided with the dispersion portion 32 formed by living radical polymerization using a silicone macromonomer as the monomer M1, it is possible to carry out the dispersion in the dispersion medium while having an excellent dispersibility.

The weight average molecular weight of the silicone oil is not particularly limited, but is preferably 250 or more to 700 or less, and more preferably 300 or more to 600 or less. Due to this, it is possible to disperse the electrophoretic particles 1 in the electrophoresis dispersion liquid while having an excellent dispersibility.

In addition, as the silicone oil, a silicone oil with a specific dielectric constant of 1.5 or more to 3 or less is preferably used, and a silicone oil of 1.7 or more to 2.8 or less is more preferably used. These silicone oils have an excellent dispersibility with respect to the electrophoretic particles 1 and the electrical insulation is also good. For this reason, the power consumption is reduced and there is a contribution to the realization of the electrophoresis display device 920 which is able to display with high contrast. Here, the value of this dielectric constant is the value measured at 50 Hz and the value measured for a dispersion medium where the amount of water contained is 50 ppm or less and the temperature is 25° C.

In addition, as necessary, for example, various additives such as electrolytes, surfactants (anionic or cationic), metal soap, resin materials, rubber materials, oils, varnish, charge control agents formed of particles such as compounds, lubricants, stabilizers, and various dyes, may be added to the dispersion medium.

It is possible to manufacture the electrophoresis dispersion liquid in which the electrophoretic particles 1 formed as above are dispersed in the dispersion medium as follows, for example.

Method of Manufacturing Electrophoresis Dispersion Liquid

Figure 3:
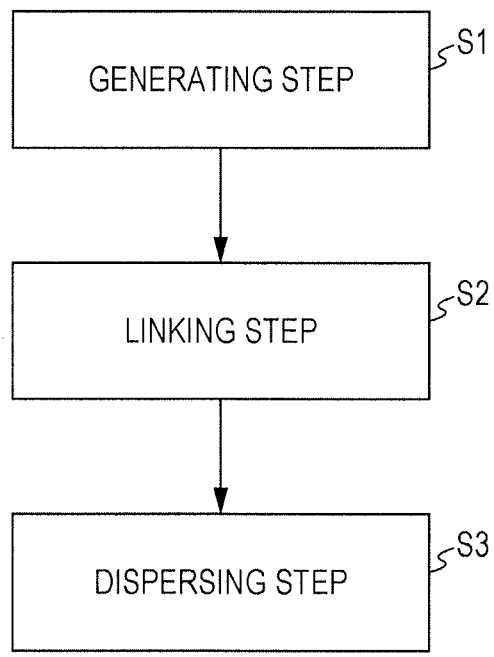
FIG. 3 is a flow chart which shows a method of manufacturing the electrophoresis dispersion liquid.

FIG. 3 is a flowchart which shows a method of manufacturing an electrophoresis dispersion liquid.

The method of manufacturing an electrophoresis dispersion liquid with the composition described above has a generating step (S1) for generating a plurality of block copolymers 39 (particle surface treatment agent) where the dispersion portion 32 and the bonding portion 31 are linked, a linking step (S2) for obtaining the electrophoretic particles 1 by linking the plurality of block copolymers 39 with the base particles 2 to form the coating layer 3 due to the reaction between the first functional group of the base particles 2 and the second functional group of the second monomer M2, and a dispersing step (S3) for obtaining an electrophoresis dispersion liquid by dispersing the obtained electrophoretic particles 1 in a dispersion medium.

A detailed description will be given below of each of the steps.

[1] First, a plurality of block copolymers 39 where the dispersion portion 32 and the bonding portion 31 are linked are generated (generating step, S1).

[1-1] First, the dispersion portion 32 where one of the first monomer M1 is bonded or a plurality of first monomers M1 are polymerized is formed by living polymerization using a polymerization initiator.

Examples of living polymerization methods include living radical polymerization, living cationic polymerization, living anionic polymerization, or the like; however, among these, living radical polymerization is preferable. Using living radical polymerization, it is possible to conveniently use a reaction solution or the like occurring in a reaction system, the controllability of the reaction is also good, and it is possible to link the monomer M1.

In addition, examples of living radical polymerization methods include atom transfer radical polymerization (ATRP), radical polymerization through nitroxide (NMP), radical polymerization using an organic tellurium (TERP), and reversible addition-fragmentation chain transfer polymerization (RAFT), and the like; however, among these, it is preferable to use reversible addition-fragmentation chain transfer polymerization (RAFT). According to reversible addition-fragmentation chain transfer polymerization (RAFT), it is possible to easily advance the linking during the linking of the monomers M1.

The polymerization initiator (radical polymerization initiator) is not particularly limited and examples thereof include azo-based initiators such as 2,2'-azobis isobutyronitrile (AIBN), 2,2'-azobis(4-methoxy-2,4-dimethylvaleronitrile), 2,2'-azobis(2,4-dimethylvaleronitrile), dimethyl 2,2'-azobis(2-methylpropionate), 1,1'-azobis(cyclohexane-1-carbonitrile), 2,2'-azobis[2-(2-imidazolin-2-yl) propane] dihydrochloride, and 2,2'-azobis[2-(2-imidazolin-2-yl) propane], persulfates such as potassium persulfate and ammonium persulfate, and the like.

In addition, in a case of using reversible addition-fragmentation chain transfer polymerization (RAFT), a chain transfer agent (RAFT agent) is used in addition to the polymerization initiator. The chain transfer agent is not particularly limited and examples thereof include sulfur compounds which have functional groups such as dithioester groups, trithiocarbamate groups, xanthate groups, and dithiocarbamate groups.

Specific examples of the chain transfer agent include the compounds which are represented by the following Chemical Formulas (1) to (7) and it is possible to use one type of these or a combination of two or more types. These compounds are comparatively easy to obtain and allow easy control of the reaction and are thus preferably used.

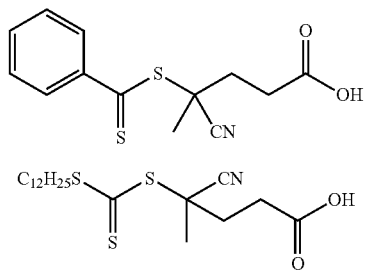

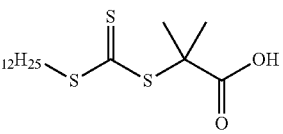

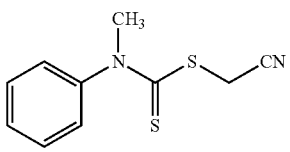

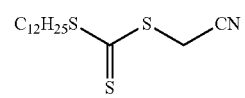

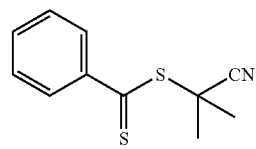

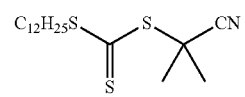

Among the above, the chain transfer agent is preferably a 2-cyano-2-propyl benzodithioate which is represented by Chemical Formula (6) described above. Due to this, it is possible to control the reaction more easily.

Furthermore, in a case of using reversible addition-fragmentation chain transfer polymerization (RAFT), the ratio of the monomer M1, the polymerization initiator, and the chain transfer agent is appropriately determined taking into consideration the reactivity of the dispersion portion 32 to be formed and the compound such as the monomer M1; however, the molar ratio of the above is preferably monomer M1:polymerization initiator:chain transfer agent=3-1:5-0.25:1. Due to this, it is possible to reliably obtain the dispersion portion 32.

In addition, examples of solvents for preparing the solution for linking the monomer M1 using living radical polymerization include water, alcohols such as methanol, ethanol, butanol, hydrocarbons such as hexane, octane, benzene, toluene, and xylene, ethers such as diethyl ether or tetrahydrofuran, esters such as ethyl acetate and butyl acetate, halogenated aromatic hydrocarbons such as chlorobenzene, o-dichlorobenzene, and the like, and it is possible to use those alone or as a mixed solvent.

In addition, the solution (reaction solution) is preferably subjected to a deoxygenation treatment before starting the polymerization reaction. Examples of deoxygenation treatments include substitution and purge treatments after vacuum degassing with an inert gas such as argon gas or nitrogen gas, and the like.

In addition, at the time of the reaction linking the monomers M1, by heating (warming) the temperature of the solution up to a predetermined temperature, it is possible to carry out the reaction linking the monomers more quickly and reliably.

The heating temperature varies slightly depending on the type or the like of the monomer M1 and is not particularly limited, but approximately 30° C. to 100° C. is preferable.

In addition, in a case where the heating temperature is set to this range, the heating time (reaction time) is preferably approximately 3 to 48 hours.

Here, when using reversible addition-fragmentation chain transfer polymerization (RAFT), fragments of the used chain transfer agent are present at one terminal (leading end portion) of the dispersion portion 32. Then, in the following step [1-2], the dispersion portion 32 provided with this fragment acts as a chain transfer agent in the reaction for linking the bonding portion 31 with the dispersion portion 32.

[1-2] Next, the bonding portion 31 where the second monomer M2 having the second functional group which has reactivity with the first functional group provided in the base particles 2 is polymerized is formed so as to link with the dispersion portion 32.

Due to this, the polymer 39 formed by the block copolymer where the dispersion portion 32 and the bonding portion 31 are linked is generated.

Here, in the present step [1-2], before forming the bonding portion 31 using the monomer M2, as necessary, a purification treatment (removal treatment) may be performed in which impurities such as the solvent used in step [1-1] and the polymerization initiator are removed and the dispersion portion 32 is isolated and purified. Due to this, the obtained polymer 39 is more uniform and has a high purity. This purification treatment is not particularly limited and examples thereof include column chromatography, recrystallization methods, re-precipitation methods, and the like, and it is possible to use one type among these or a combination of two or more types.

In addition, as described above, when using reversible addition-fragmentation chain transfer polymerization (RAFT), fragments of the used chain transfer agent are present in one terminal of the dispersion portion 32. For this reason, the bonding portion 31 of this composition is formed by preparing a solution which contains the dispersion portion 32, the monomer M2, and the polymerization initiator obtained by completing step [1-1] and carrying out living polymerization again in the solution.

Here, as the solvent used in the present step, it is possible to use the same solvents as exemplified for step [1-1] and, in addition, it is possible to set the conditions when polymerizing the monomer M2 in the solution to be the same as those exemplified as the conditions when polymerizing the monomer M1 in the solution in step [1-1].

In addition, after the present step [1-2], a purification treatment (removal treatment) is performed in which the impurities such as the solvent used in the present step [1-2] are removed and the polymer 39 is isolated and purified. Due to this, in the following step [2], it is possible to smoothly perform the linking of the polymer 39 with the base particles 2 and a detailed description thereof will be given below. This purification treatment is not particularly limited and examples thereof include column chromatography, recrystallization methods, re-precipitation methods, and the like, and it is possible to use one type among these or a combination of two or more types.

[2] Next, by reacting the first functional group provided in the base particles 2 and the plurality of second functional groups of the bonding portion 31 and forming chemical bonds therebetween, the coating layer 3 is formed by linking the plurality of the block copolymers 39 (particle surface treatment agent) with the surface of the base particles 2 (linking step, S2).

Due to this, the electrophoretic particles 1 where at least a part of the base particles 2 is coated with the coating layer 3 are obtained.

In the present step, the method shown below is preferably applied to manufacture the electrophoretic particles 1.

Here, as described above, normally, it is considered that the polymer 39 is linked with the surface of the base particles 2 by preparing a solution by mixing the polymer 39 and the base particles 2 in the solvent, then, forming a chemical bond between the alkoxysilyl group (the second functional group) and the hydroxyl group (the first functional group) while stirring and heating the solution.

In such a case, it is considered that the same solvents as exemplified for step [1-1] are used as the solvent used when preparing the solution and silicone oil exemplified as the dispersion liquid provided in the electrophoresis dispersion liquid is used.

However, when the solvent is included in the solution in this manner and when the solvent exhibits an affinity in comparison with the dispersion portion 32, since the dispersion portions 32 exhibiting a hydrophobic property are aggregated together and, as a result, the polymer 39 is aggregated together in the solution and there is a problem in that the adsorption amount of the polymer 39 with respect to the base particles 2 is not improved. In addition, as in a case of using silicone oil as the solvent, even when the solvent exhibits the same hydrophobic property as the dispersion portion 32, the solvent itself is adsorbed to the surface of the base particles 2 and, due to this, there is a problem in that the adsorption amount of the polymer 39 with respect to the base particles 2 is not improved.

In contrast, in the present step, the addition of a solvent for dissolving the polymer 39 into the mixture containing the base particles 2 and the polymer 39 is omitted. Due to this, it is possible to improve the chances of contact with the base particles 2 and the polymer 39.

However, as described above, even when the addition of the solvent to the mixture containing the base particles 2 and the polymer 39 is omitted, it may not be possible to sufficiently improve the adsorption amount of the polymer 39 with respect to the base particles 2.

Here, as described in step [1-2], after step [1-2], a purification treatment (a removal treatment) in which the polymer 39 is isolated and purified is performed with the object of removing impurities such as the solvent used in step [1-2].

In addition, in the dispersion portion 32 formed by living radical polymerization using the silicone macromonomer (siloxane-based compound) which is represented by General Formula (I) described above as the monomer M1, the silicone macromonomer which is represented by General Formula (I) described above is normally generated by polymerization by advancing a hydrosilylation reaction as in the following Reaction Formula (i). Therefore, unreacted products remain in the reaction system as shown in the following General Formula (i-2).

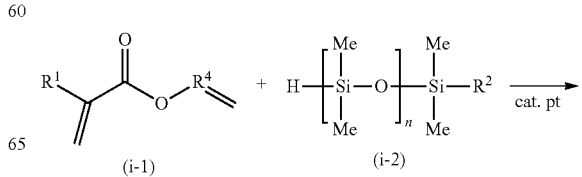

-continued

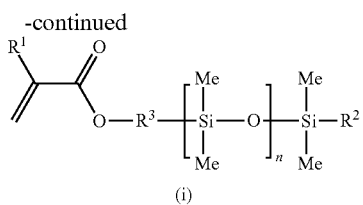

(i)

[In the formula, $R^1$ represents a hydrogen atom or a methyl group, $R^2$ represents a hydrogen atom or an alkyl group having 1 to 4 carbon atoms, $R^3$ represents a structure which includes one type out of an alkyl group having 1 to 6 carbon atoms and an ether group of ethylene oxide or propylene oxide, $R^4$ represents a structure obtained by removing a methylene group from the terminal of $R^3$ on the Si side, and n represents an integer of 0 or more.]

Therefore, as described above, even when a purification treatment is performed using column chromatography, a re-crystallization method, a re-precipitation method, or the like in order to isolate and purify the polymer 39, since the silicone macromonomer which is represented by General Formula (I) described above and the unreacted products which are represented by General Formula (i-2) described above exhibit almost the same physical properties, in the purified polymer 39, these unreacted products are mixed in, as well as reaction by-products generated when generating the polymer 39.

Specifically, for example, the weight average molecular weight of the unreacted products which are represented by General Formula (i-2) described above is preferably approximately 1,000 or more to 50,000 or less, and more preferably approximately 3,000 or more to 30,000 or less.

In addition, in a case where the unreacted products which are represented by General Formula (i-2) described above are defined by the boiling point, the boiling point thereof is preferably approximately 180° C. or more to 250° C. or less, and more preferably approximately 200° C. or more to 240° C. or less.

Even when the addition of the solvent to the mixture containing the base particles 2 and the polymer 39 is omitted, it is clear that the introduction of these unreacted products and reaction by-products is a factor why it is not possible to sufficiently improve the adsorption amount of the polymer 39 with respect to the base particles 2, and it was found that it is possible to solve the above problems by setting the content of the polymer (particle surface treatment agent) 39 to 70 weight % or more excluding the plurality of base particles 2 in the mixture containing the base particles 2 and the polymer 39.

That is, it is possible to sufficiently improve the adsorption amount of the polymer 39 with respect to the base particles 2 by setting the content of the polymer (particle surface treatment agent) 39 to 70 weight % or more excluding the plurality of base particles 2 in the mixture containing the base particles 2 and the polymer 39 and, as a result, when the weight of the electrophoretic particles 1 is set to 100 weight %, it is possible to obtain the electrophoretic particles 1 provided with the coating layer 3 where the weight of the polymer (particle surface treatment agent) 39 is set to 10 weight % or more to 30 weight % or less.

With the content of the polymer (particle surface treatment agent) 39 set to 70 weight % or more, the present step [2] for linking the polymer 39 with the surface of the base particles 2 is carried out as described in more detail below.

[2-1] First, a mixture which contains the base particles 2 and the polymer 39 is prepared.

At this time, as described above, in this mixture, the unreacted products (for example, the unreacted products which are represented by General Formula (i-2) described above) of the raw material used when generating the polymer 39 and the reaction by-products generated when generating the polymer 39 are introduced into the mixture; however, in the invention, a mixture is prepared with the content of the polymer 39 set to 70 weight % or more excluding the base particles 2 in the mixture.

Here, the content of the polymer 39 excluding the base particles 2 in the mixture may be set to 70 weight % or more; however, 80 weight % or more is preferable and 90 weight % or more to 95 weight % or less is more preferable. Due to this, it is possible to more reliably improve the adsorption amount of the polymer 39 with respect to the base particles 2.

In addition, when the weight of the base particles 2 in the mixture is set as 100 weight %, the weight of the polymer 39 is preferably 50 weight % or more to 500 weight % or less, and more preferably 100 weight % or more to 200 weight % or less. Setting the content of the polymer 39 within this range makes it possible to improve the chance of the polymer 39 contacting the surface of the base particles 2, thus it is possible to reliably make the polymer 39 contact the surface of the base particles 2 and be more uniformly adsorbed thereto.

[2-2] Next, in the mixture, the polymer 39 is linked with the surface of the base particles 2.

Due to this, the electrophoretic particles 1 where the coating layer 3 is formed on at least a part of the surface of the base particles 2 are obtained.

The linking of the polymer 39 with the surface of the base particles 2 is performed by heating the mixture.

The temperature when heating the mixture is not particularly limited; however, approximately 100° C. or more to 250° C. or less is preferable and approximately 150° C. or more to 200° C. or less is more preferable.

In addition, the time of heating the mixture is preferably approximately 1 hour or more to 15 hours or less, and more preferably approximately 3 hours or more to 10 hours or less.

Under such conditions, by heating the mixture, it is possible to link the polymer 39 with the surface of the base particles 2 with a high coating density and, as a result, when the weight of the electrophoretic particles 1 is set to 100 weight %, it is possible to reliably obtain the electrophoretic particles 1 provided with the coating layer 3 where the weight of the polymer (particle surface treatment agent) 39 is set to 10 weight % or more to 30 weight % or less.

Here, when the electrophoretic particles 1 are obtained by carrying out step [2-1] and the present step [2-2], for example, in a case where the molecular weight of the particles composed of the polymer 39 is 16,000, it is only necessary to set a minute surface area (occupied area) of the base particles 2 of approximately $5.0 \times 10^{-18}$ m$^2$ or more to $7.0 \times 10^{-18}$ m$^2$ or less to be able to link one of the polymers 39 with the base particles 2.

Therefore, as described above, even when the specific surface area is small such that the average particle diameter of the base particles 2 is approximately 50 nm or more to 400 nm or less, that is, the specific surface area of the base particles 2 is approximately 5 m$^2$/g or more to 50 m$^2$/g or less, it is possible to obtain the electrophoretic particles 1 in a state where the polymer 39 is linked with respect to the base particles 2 with a high coating ratio such that the weight of the polymer (particle surface treatment agent) 39 is 5 weight % or more to 15 weight % or less.

Here, prior to heating the mixture, an ultrasonic treatment may be carried out with respect to the mixture. Due to this, it is possible to further improve the dispersibility of the base particles 2 in the mixture.

In addition, the heating of the mixture is preferably carried out while stirring the mixture. Due to this, it is possible to make the polymer 39 uniformly contact the surface of the base particles 2.

The stirring of the mixture is performed, for example, using a ball mill, a bead mill, or the like.

[2-3] Next, by separating using a centrifugal separator, excess polymer 39 adsorbed to the surface of the base particles 2 and the unreacted products and the reaction by-products are removed without forming a chemical bond.

Due to this, the purified electrophoretic particles 1 are obtained.

[3] Next, the electrophoresis dispersion liquid is obtained by dispersing the obtained electrophoretic particles 1 in the dispersion medium (dispersing step, S3).

In the present embodiment, a medium where the silicone oil described above is the main component is used as the dispersion medium.

In addition, the method of dispersing the electrophoretic particles 1 in the dispersion medium is not particularly limited and examples thereof include a paint shaker method, a ball mill method, a media mill method, an ultrasonic dispersion method, a stirring dispersion method, and the like, and it is possible to use one type or a combination of two or more types among these.

Through the above steps, it is possible to obtain the electrophoresis dispersion liquid which contains the electrophoretic particles 1.

Here, in the present embodiment, in step [1], a description was given of a case of generating the block copolymer 39 by linking the bonding portion 31 with the dispersion portion 32 after forming the dispersion portion 32; however, without being limited to this case, the block copolymer 39 may be generated by linking the dispersion portion 32 with the bonding portion 31 after forming the bonding portion 31.

Electrophoresis Display Device

Next, a description will be given of the electrophoresis display device (the electrophoresis device according to the aspect of the invention) to which the electrophoresis sheet according to the aspect of the invention is applied.

Figure 5:
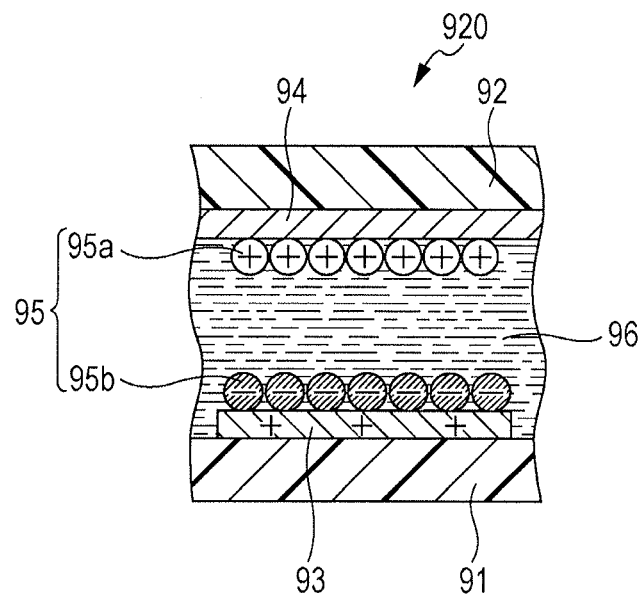
FIG. 5 is a schematic diagram which shows a working principle of the electrophoresis display device shown in FIG. 4.
Figure 6:
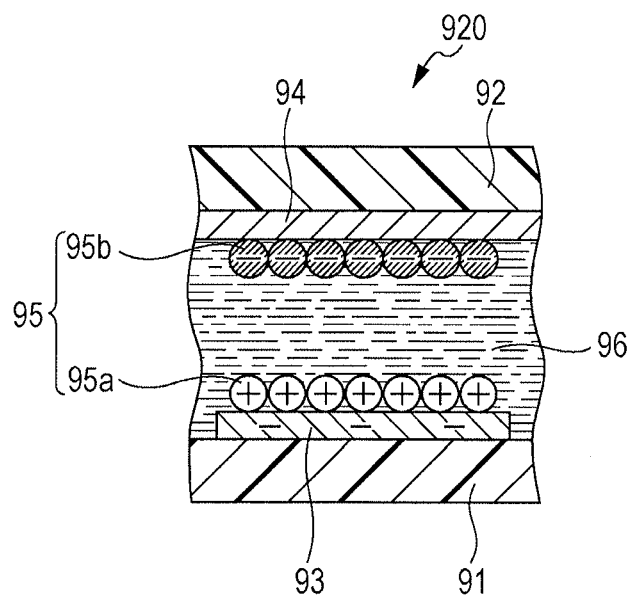
FIG. 6 is a schematic diagram which shows a working principle of the electrophoresis display device shown in FIG. 4.

FIG. 4 is a diagram which schematically shows a longitudinal cross-section of an embodiment of the electrophoresis display device and FIGS. 5 and 6 are schematic diagrams which shows the working principles of the electrophoresis display device shown in FIG. 4. Here, in the following, for convenience of description, a description will be given referring to the upper side in FIGS. 4 to 6 as "upper" and the lower side as "lower".

The electrophoresis display device 920 shown in FIG. 4 has an electrophoretic display sheet (front plane) 921, a circuit substrate (back plane) 922, an adhesive layer 981 which bonds the electrophoretic display sheet 921 and the circuit substrate 922, and a sealing portion 97 which hermetically seals the gap between the electrophoretic display sheet 921 and the circuit substrate 922.

The electrophoretic display sheet (electrophoresis sheet according to the aspect of the invention) 921 has a substrate 912 provided with a plate-like base portion 92 and a second electrode 94 provided on the lower surface of the base portion 92, and a display layer 9400 provided on the lower surface (one surface) side of the substrate 912 and formed of a dividing wall 940 formed in a matrix and an electrophoresis dispersion liquid 910.

On the other hand, the circuit substrate 922 has a counter substrate 911 provided with the plate-like base portion 91 and a plurality of first electrodes 93 provided on the upper surface of the base portion 91, a circuit (not shown) provided on the counter substrate 911 (base portion 91) and including switching elements such as TFT, and driving IC (not shown) driving the switching element.

A description will be given below of each portion of the composition.

The base portion 91 and the base portion 92 are each formed of a sheet-like (plate-like) member and have a function of supporting and protecting each member arranged therebetween.

Each of the base portions 91 and 92 may be either a portion which has flexibility or which has hardness; however, a portion which has flexibility is preferable. Using base portions 91 and 92 which have flexibility makes it possible to obtain the electrophoresis display device 920 which has flexibility, that is, the electrophoresis display device 920 which is, for example, useful in making electronic paper.

In addition, in a case where each of the base portions (base material layers) 91 and 92 has flexibility, these are preferably formed of a resin material.

The average thickness of the base portions 91 and 92 is appropriately set for each according to the constituent material, the application, or the like and is not particularly limited; however, approximately 20 to 500 µm is preferable, and approximately 25 to 250 µm is more preferable.

The first electrode 93 and the second electrode 94 in layer form (film form) are each provided on the surface of the dividing wall 940 side of these base portions 91 and 92, that is, on the upper surface of the base portion 91 and the lower surface of the base portion 92.

When a voltage is applied between the first electrode 93 and the second electrode 94, an electric field is generated therebetween and the electric field acts on the electrophoretic particles 95.

In the present embodiment, the second electrode 94 is set as a common electrode and the first electrodes 93 are set as individual electrodes (pixel electrodes connected to the switching element) divided into a matrix (rows and columns) and the portion where the second electrode 94 overlaps with one of the first electrodes 93 forms one pixel.

The constituent material of each of the electrodes 93 and 94 is not particularly limited as long as the material is substantially conductive.

The average thickness of the electrodes 93 and 94 is appropriately set for each according to the constituent material, the application, or the like and is not particularly limited; however, approximately 0.05 to 10 µm is preferable, and approximately 0.05 to 5 µm is more preferable.

Here, among each of the base portions 91 and 92 and each of the electrode 93 and 94, the base portion and electrode (in the present embodiment, the base portion 92 and the second electrode 94) arranged on the display surface side each have a light transmitting property, that is, are substantially transparent (colorless and transparent, colored and transparent, or translucent).

In the electrophoretic display sheet 921, the display layer 9400 is provided in contact with the lower surface of the second electrode 94.

The display layer 9400 is formed to accommodate (encapsulate) the electrophoresis dispersion liquid (the electrophoresis dispersion liquid according to the aspect of the invention described above) 910 in a plurality of pixel spaces 9401 divided by dividing walls 940 (structural bodies).

The dividing walls 940 are formed so as to divide between the counter substrate 911 and the substrate 912 in a matrix.

Examples of the constituent material of the dividing wall 940 include various resin materials such as thermoplastic resins such as acrylic resin, urethane-based resin, and olefin-based resin, and thermosetting resins such as epoxy-based resins, melamine-based resins, and phenolic resins, and one type among the above may be used or a combination of two or more types may be used.

In the present embodiment, the dividing wall 940 is bonded with the second electrode 94 via an adhesive layer 982 and, due to this, the dividing wall 940 is fixed to the substrate 912.

In the present embodiment, the electrophoresis dispersion liquid 910 accommodated in the pixel spaces 9401 has two types (at least one type of the electrophoretic particles 1) of the colored particles 95b and the white particles 95a are dispersed (suspended) in a dispersion medium 96, and the electrophoresis dispersion liquid 910 is applied as the electrophoresis dispersion liquid according to the aspect of the invention described above.

In the electrophoresis display device 920, when the voltage is applied between the first electrode 93 and the second electrode 94, due to the electric field generated therebetween, the colored particles 95b and the white particles 95a (electrophoretic particles 1) undergo electrophoresis toward either of the electrodes.

In the present embodiment, particles having a positive charge are used as the white particles 95a and particles having a negative charge are used as the colored particles (black particles) 95b. That is, the electrophoretic particles 1 where the base particles 2 are positively charged are used as the white particles 95a and the electrophoretic particles 1 where the base particles 2 are negatively charged are used as the colored particles 95b.

In a case where the electrophoretic particles 1 are used, when the first electrode 93 is set to a negative potential, as shown in FIG. 6, the colored particles 95b are moved to the second electrode 94 side and gathered at the second electrode 94. On the other hand, the white particles 95a are moved to the first electrode 93 side and gathered at the first electrode 93. For this reason, when the electrophoresis display device 920 is viewed from above (the display surface side), the color of the colored particles 95b is visible, that is, black is visible.

In contrast, when the first electrode 93 is set to the positive potential, as shown in FIG. 5, the colored particles 95b are moved to the first electrode 93 side and gathered at the first electrode 93. On the other hand, the white particles 95a are moved to the second electrode 94 side and gathered at the second electrode 94. For this reason, when the electrophoresis display device 920 is viewed from above (the display surface side), the color of the white particles 95a is visible, that is, white is visible.

In such a configuration, by appropriately setting the charge amount of the white particles 95a and the colored particles 95b (electrophoretic particles 1), the polarity of the electrode 93 or 94, the potential difference between the electrodes 93 and 94, and the like, the desired information (image) is displayed on the display surface side of the electrophoresis display device 920 according to the combination of the colors of the white particles 95a and the colored particles 95b or the number of the particles gathered at the electrodes 93 and 94, and the like.

In addition, the specific gravity of the electrophoretic particles 1 is preferably set so as to be substantially equal to the specific gravity of the dispersion medium 96. Due to this, it is possible to retain the electrophoretic particles 1 for a long time at a determined position in the dispersion medium 96 even after stopping the application of a voltage to the electrodes 93 and 94. That is, the information displayed on the electrophoresis display device 920 is held for a long time.

Here, the average particle diameter of the electrophoretic particles 1 is preferably approximately 0.1 to 10 μm and more preferably approximately 0.1 to 7.5 μm. Setting the average particle diameter of the electrophoretic particles 1 to this range makes it possible to reliably prevent aggregation between the electrophoretic particles 1 or sedimentation in the dispersion medium 96 and, as a result, it is possible to favorably prevent the deterioration of the display quality of the electrophoresis display device 920.

In the present embodiment, the electrophoretic display sheet 921 and the circuit substrate 922 are bonded via the adhesive layer 981. Due to this, it is possible to more reliably fix the electrophoretic display sheet 921 and the circuit substrate 922.

The average thickness of the adhesive layer 981 is not particularly limited; however, approximately 1 to 30 μm is preferable and approximately 5 to 20 μm is more preferable.

Between the base portion 91 and the base portion 92, the sealing portion 97 is provided along the edges thereof. Each of the electrodes 93 and 94, the display layer 9400, and the adhesive layer 981 are hermetically sealed by the sealing portion 97. Due to this, the introduction of moisture into the electrophoresis display device 920 is prevented and it is possible to more reliably prevent the deterioration of the display performance of the electrophoresis display device 920.

As the constituent material of the sealing portion 97, it is possible to use the same constituent materials as exemplified as the constituent materials of the dividing walls 940 described above.

Electronic Apparatus

Next, a description will be given of the electronic apparatus according to the aspect of the invention.

The electronic apparatus according to the aspect of the invention is provided with the electrophoresis display device 920 described above.

Electronic Paper

First, a description will be given of the embodiment in a case where the electronic apparatus according to the aspect of the invention is applied to electronic paper.

Figure 7:
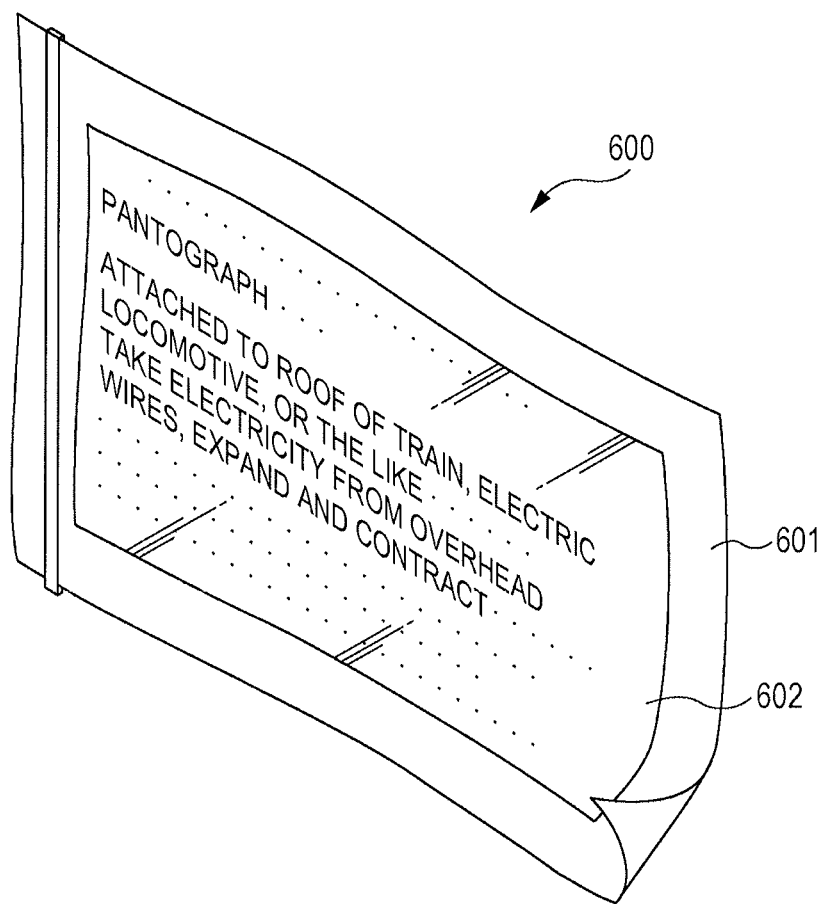
FIG. 7 is a perspective view which shows an embodiment in a case where an electronic apparatus according to the aspect of the invention is applied to electronic paper.

FIG. 7 is a perspective view which shows an embodiment in a case where the electronic apparatus according to the aspect of the invention is applied to electronic paper.

An electronic paper 600 shown in FIG. 7 is provided with a main body 601 formed of a rewritable sheet having the same texture and flexibility as paper and a display unit 602.

In the electronic paper 600, the display unit 602 is formed of the electrophoresis display device 920 described above.

Display

Next, a description will be given of an embodiment in a case where the electronic apparatus according to the aspect of the invention is applied to a display.

Figure 8:
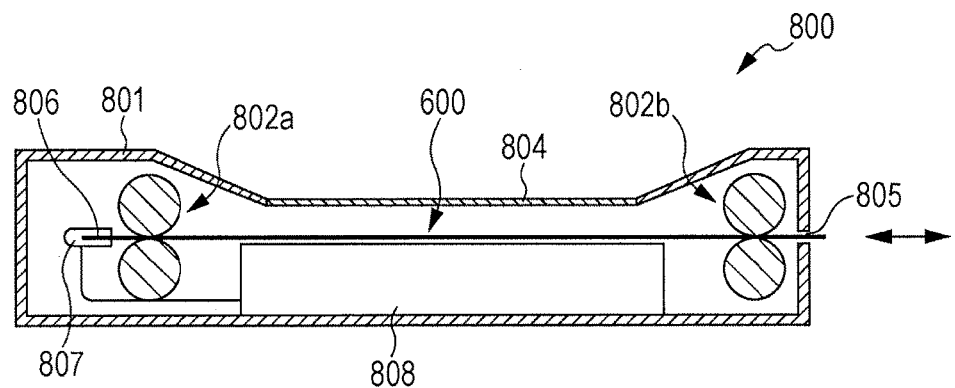
FIG. 8 is a diagram which shows an embodiment in a case where the electronic apparatus according to the aspect of the invention is applied to a display.
Figure 9:
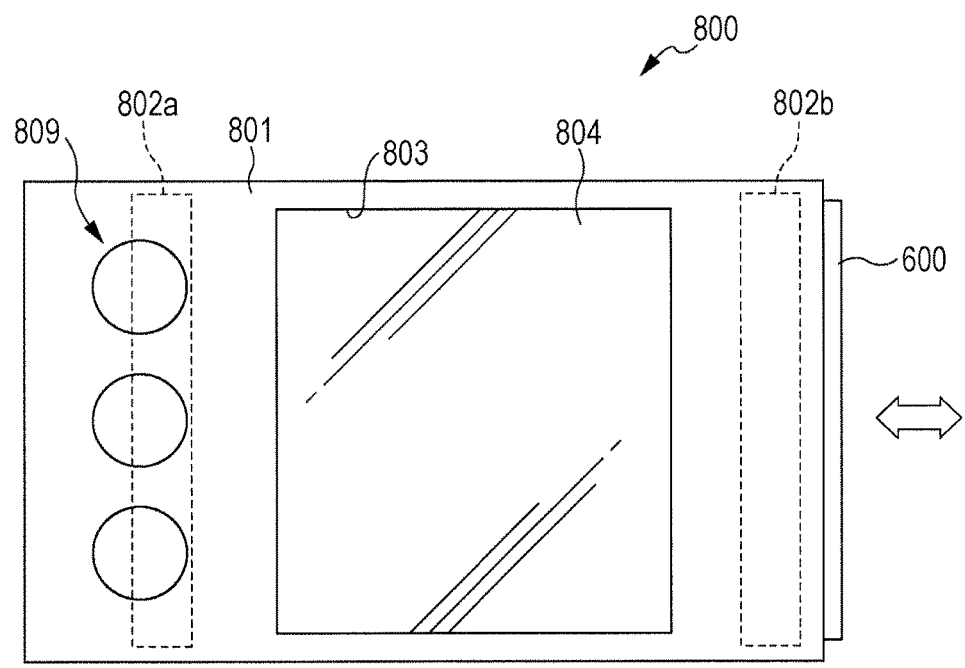
FIG. 9 is a diagram which shows an embodiment in a case where the electronic apparatus according to the aspect of the invention is applied to a display.

FIGS. 8 and 9 are diagrams which show an embodiment in a case where the electronic apparatus according to the aspect of the invention is applied to a display. Among these, FIG. 8 is a cross-sectional view and FIG. 9 is a planar view.

A display (display device) 800 shown in FIGS. 8 and 9 is provided with a main body portion 801 and electronic paper 600 provided to be attachable and detachable with respect to the main body portion 801.

The main body portion 801 is provided with an insertion opening 805 into which it is possible to insert the electronic paper 600 in the side portion (the right side in FIG. 8) thereof and two pairs of transport rollers 802a and 802b in the interior thereof. When the electronic paper 600 is inserted into the main body portion 801 via the insertion opening 805, the electronic paper 600 is installed in the main body portion 801 in a state of being pinched by a pair of the transport rollers 802a and 802b.

In addition, a rectangular hole portion 803 is formed on the display surface side (the front side of the paper in FIG. 9) of the main body portion 801 and a transparent glass plate 804 is fitted into the hole portion 803. Due to this, it is possible to visually recognize the electronic paper 600 from the outside of the main body portion 801 in a state of being installed in the main body portion 801. That is, in the display 800, the display surface is formed by making the electronic paper 600 visible in the transparent glass plate 804 in a state of being installed in the main body portion 801.

In addition, a terminal portion 806 is provided on the insertion direction leading end portion (the left side in FIG. 8) of the electronic paper 600 and a socket 807 connected with the terminal portion 806 is provided in a state where the electronic paper 600 is installed in the main body portion 801 in the interior of the main body portion 801. A controller 808 and an operation portion 809 are electrically connected with the socket 807.

In the display 800, the electronic paper 600 is installed detachably in the main body portion 801 and it is also possible to use the electronic paper 600 as a mobile device in a state of being detached from the main body portion 801.

In addition, in the display 800, the electronic paper 600 is formed of the electrophoresis display device 920 described above.

Here, the electronic apparatus according to the aspect of the invention is not limited to application to the application described above and examples thereof include televisions, view-finder-type and monitor direct-view type video tape recorders, car navigation devices, pagers, electronic organizers, calculators, electronic newspapers, word processors, personal computers, work stations, TV phones, POS terminals, equipment provided with a touch panel, and the like, and it is possible to apply the electrophoresis display device 920 in the display portions of each of the types of electronic apparatus.

A description was given above of the electrophoresis dispersion liquid, the electrophoresis sheet, the electrophoresis device, and the electronic apparatus according to the aspect of the invention based on the illustrated embodiments; however, the invention is not limited thereto and the configuration of each of the portions is able to be switched to an optional configuration having the same type of function. In addition, other optional constituent parts may be added to the invention.

EXAMPLES

Next, a description will be given of specific examples according to the aspect of the invention.

Production of Electrophoretic Particles, Preparation of Electrophoresis Dispersion Liquid, and Evaluation of Electrophoresis Dispersion Liquid 1. Synthesis of Block Copolymer by Polymerization 70 g of a silicone macromonomer of a terminal methacrylic group having a weight average molecular weight of 16,000, 1.0 g of 2-cyano-2-propyl benzodithioate, and 400 mg of azobisisobutyronitrile were added to a flask, the system was changed to nitrogen, then 100 mL of ethyl acetate was further added, 5.0 g of 3-methacryloxypropyl triethoxysilane ("KBE-503", manufactured by Shin-Etsu Chemical Co., Ltd.) was added, and polymerization was performed by further heating and stirring at 75° C. for four hours. The resultant was cooled to room temperature to finish the reaction and a block copolymer where a dispersion portion and a bonding portion were linked was obtained by removing the solvent.

Here, in the obtained block copolymer, it was possible to determine the number of the first units and the number of the second units using NMR ("Model Number 500 NB", manufactured by Varian Medical Systems) and the number of the first units was 1 and the number of the second units was 2.

2. Preparation of Electrophoresis Dispersion Liquid

Example 1A

First, a mixture was prepared by adding 60 g of titania particles ("CR50" manufactured by Ishihara Sangyo Kaisha, Ltd.) to 10 g of the block copolymer (raw material) obtained as described above in a flask, then, after subjecting the mixture to an ultrasonic treatment for one hour, electrophoretic particles were obtained by bonding the block copolymer to the particles by heating and stirring for four hours at 150° C. After removing the unreacted block copolymer from the solution after the reaction, an electrophoresis dispersion liquid including white particles was obtained by adding the obtained electrophoretic particles to "KF-96-2cs" manufactured by Shin-Etsu Chemical Co., Ltd.

Here, the specific surface area of the titania particles measured using a nitrogen gas adsorption (BET) method was 13.1 m$^2$/g, the content (coating ratio) of a block copolymer (particle surface treatment agent) in the electrophoretic particles calculated from the difference in weight between the titania particles and the obtained electrophoretic particles was 5.20 weight %. In addition, the surface area (occupied area) of the base particles which was necessary to link one block copolymer with the base particles (titania particles) was $6.7 \times 10^{-18}$ m$^2$. Here, this occupied area is determined by determining the number of block copolymers linked with 1 g of the base particles from the weight of the 1 molecule of block copolymer (one) determined from the weight average molecular weight (16,000) of the block copolymer and the Avogadro constant ($6.02 \times 10^{23}$) and the weight of the block copolymer linked with 1 g of the base particles (titania particles) and dividing the surface area of 1 g of the base particles by the number of the block copolymer linked with 1 g of the obtained base particles. In addition, the content (coating ratio) of the block copolymers is determined by dividing the weight of the block copolymer bonded with the titania particles by the weight of the electrophoretic particles (the total weight of the titania particles and the block copolymer linked with the titania particles).

In addition, an electrophoresis dispersion liquid including black particles was obtained in the same manner as above except that 60 g of titanium black particles ("13MT" manufactured by Mitsubishi Materials Corporation) were used instead of the titania particles.

Here, the specific surface area of the titania black particles measured using a nitrogen gas adsorption (BET) method was 30.0 m$^2$/g, and the content (coating ratio) of a block copolymer (particle surface treatment agent) in the electrophoretic particles calculated from the difference in the weight between the titanium black particles and the obtained electrophoretic particles was 12.1 weight %. In addition, the surface area (occupied area) of the base particles which was necessary to link one block copolymer with the base particles (titanium black particles) was $6.6\times10^{-18}$ m$^2$.

Next, an electrophoresis dispersion liquid of Example 1A including the white particles and the black particles was prepared by mixing the electrophoresis dispersion liquid including white particles and the electrophoresis dispersion liquid including the black particles to be a volume ratio of 12:1.

Comparative Example 1A

First, a mixture was prepared by adding 30 g of "KF-96-2cs" manufactured by Shin-Etsu Chemical Co., Ltd. which is a reaction solvent, 0.6 g of the block copolymer (raw material) obtained as described above, and 3 g of titania particles ("CR97" manufactured by Ishihara Sangyo Kaisha, Ltd.) in a flask, then, after subjecting the mixture to an ultrasonic treatment for one hour, electrophoretic particles were obtained by bonding the block copolymer to the particles by heating and stirring for four hours at 150° C. After removing the unreacted block copolymer from the solution after the reaction, an electrophoresis dispersion liquid including white particles was obtained by adding the obtained electrophoretic particles to "KF-96-2cs" manufactured by Shin-Etsu Chemical Co., Ltd.

Here, the specific surface area of the titania particles measured using a nitrogen gas adsorption (BET) method was 13.7 m$^2$/g, the content (coating ratio) of a block copolymer (particle surface treatment agent) in the electrophoretic particles calculated from the difference in the weight between the titanium black particles and the obtained electrophoretic particles was 1.24 weight %. In addition, the surface area (occupied area) of the base particles which was necessary to link one block copolymer with the base particles (titania particles) was $3.0\times10^{-17}$ m$^2$.

In addition, an electrophoresis dispersion liquid including black particles was obtained in the same manner as above except that 60 g of titanium black particles ("13MT" manufactured by Mitsubishi Materials Corporation) were used instead of the titania particles.

Here, the specific surface area of the titania black particles measured using a nitrogen gas adsorption (BET) method was 30.0 m$^2$/g, the content (coating ratio) of a block copolymer (particle surface treatment agent) in the electrophoretic particles calculated from the difference in weight between the titanium black particles and the obtained electrophoretic particles was 2.74 weight %. In addition, the surface area (occupied area) of the base particles which was necessary to link one block copolymer with the base particles (titanium black particles) was $2.9\times10^{-17}$ m$^2$.

Next, an electrophoresis dispersion liquid of Comparative Example 1A including the white particles and the black particles was prepared by mixing the electrophoresis dispersion liquid including white particles and the electrophoresis dispersion liquid including the black particles to be a volume ratio of 10:1.

3. Evaluation of Electrophoresis Dispersion Liquid

The display performance was evaluated in the following manner for each of the electrophoresis dispersion liquids of the Examples and the Comparative Examples.

Display Performance Evaluation

For each of the electrophoresis dispersion liquids of the Examples and Comparative Examples, after injecting each of the electrophoresis dispersion liquids into transparent electrode cells with a thickness of 50 μm, the white reflectivity when displaying white and the black reflectivity when displaying black were measured.

Here, in the driving method when displaying white and displaying black, after displaying white by applying a voltage for one second between the transparent electrodes, the display was left on for 30 seconds, then, after displaying black by applying a voltage for one second between the transparent electrode after reversing the positive and negative, the display was left on for 30 seconds. In addition, the measurement of the white reflectivity and the black reflectivity was carried out after applying a voltage between the transparent electrodes for one second to carry out each of the white display and the black display.

For each of the electrophoresis dispersion liquids of the Examples and Comparative Examples, after injecting each of the electrophoresis dispersion liquids into transparent electrode cells with a thickness of 50 μm, the response speed when displaying white and the response speed when displaying black were measured.

Here, the response speed at the time of white display was determined by measuring the time (seconds) until the white reflectivity was 40% when a voltage was applied between the transparent electrodes in order to display the white, and the response speed at the time of black display was determined by measuring the time (seconds) until the black reflectivity was 5% when a voltage was applied between the transparent electrodes after reversing the positive and negative in order to display the black.

The results of the evaluation are shown in Tables 1 and 2.

TABLE 1

| | White particles | | | | | Black particles | | | | |
|---|---|---|---|---|---|---|---|---|---|---|
| | Base particles | Specific surface area of base particles | Content of block copolymer in electrophoretic particles | Ratio of content of Example and Comparative Example | Occupied area of one block copolymer in base particles | Base particles | Specific surface area of base particles | Content of block copolymer in electrophoretic particles | Ratio of content of Example and Comparative Example | Occupied area of one block copolymer in base particles |
| Example 1A | CR50 | 13.1 m$^2$/g | 5.20 weight % | 4.4 | $6.7\times10^{-18}$ m$^2$ | 13MT | 30.0 m$^2$/g | 12.1 weight % | 5.0 | $6.6\times10^{-18}$ m$^2$ |
| Comparative Example 1A | CR97 | 13.7 m$^2$/g | 1.24 weight % | | $3.0\times10^{-17}$ m$^2$ | 13MT | 30.0 m$^2$/g | 2.74 weight % | | $2.9\times10^{-17}$ m$^2$ |

TABLE 2

| | Electrophoresis dispersion liquid | | | | | |
|---|---|---|---|---|---|---|
| | Content of particles (white particles + black particles) | Ratio of white particles and black particles | Evaluation | | | |
| | | | White reflectivity | Black reflectivity | Time necessary until white reflectivity 40% | Time necessary until black reflectivity 5% |
| Example 1A | 20 weight % | 12:1 | 46.6% | 2.5% | 0.21 sec | 0.27 sec |
| Comparative Example 1A | 40 weight % | 10:1 | 41.2% | 4.8% | 0.29 sec | 0.88 sec |

As is clear from Tables 1 and 2, in the electrophoresis dispersion liquids which are a combination of the white particles and the black particles of the Examples, in comparison with the electrophoresis dispersion liquids which are a combination of the white particles and the black particles of the Comparative Examples, in the white particles, the coating amount of the block copolymer is 4.4 times the amount of the base particles and, in the black particles, the coating amount of the block copolymer is 5.0 times the amount of the base particles. Due to this, even when the content of the electrophoretic particles (the total of the white particles and the black particles) in the electrophoresis dispersion liquid is set to be low in comparison with the 40 weight % of the Comparative Example, such as 20 weight % in the Examples, results were obtained which exhibited reflectivity characteristics substantially the same as the Comparative Examples in both the white reflectivity and the black reflectivity in the Examples.

In addition, in the electrophoresis dispersion liquid of the Examples, the content of the electrophoretic particles (the total of the white particles and the black particles) in the electrophoresis dispersion liquid is set to be low at 20 weight % in comparison with the content of the electrophoretic particles in the electrophoresis dispersion liquid of the Comparative Example at 40 weight %, thus it was possible to increase the speed of the display speed (the time necessary until the white reflectivity was 40% and the time necessary until the black reflectivity was 5%) during the white display and the black display.

The entire disclosure of Japanese Patent Application No. 2016-028008, filed Feb. 17, 2016 is expressly incorporated by reference herein.

What is claimed is:
1. An electrophoresis dispersion liquid comprising:
at least one type of electrophoretic particles; and
a dispersion medium,
wherein,
in the electrophoresis dispersion liquid, a content of the electrophoretic particles is 10 weight % or more to 30 weight % or less,
the electrophoretic particles have base particles and a particle surface treatment agent linking with at least one of the base particles,
the particle surface treatment agent has a dispersion portion derived from a silicone macromonomer represented by General Formula (I) below

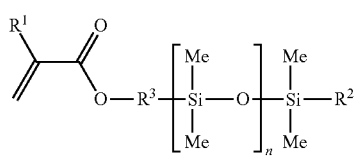

where $R^1$ represents a hydrogen atom or a methyl group, $R^2$ represents a hydrogen atom or an alkyl group having 1 to 4 carbon atoms, $R^3$ represents a structure which includes one type out of an alkyl group having 1 to 6 carbon atoms and an ether group of ethylene oxide or propylene oxide, and n represents an integer of 0 or more, and
a content of the particle surface treatment agent in the electrophoretic particles is 5 weight % or more to 15 weight % or less.
2. The electrophoresis dispersion liquid according to claim 1,
wherein an average particle diameter of the base particles is 50 nm or more to 400 nm or less.
3. The electrophoresis dispersion liquid according to claim 1, wherein
the base particles have a hydroxyl group on a surface,
the particle surface treatment agent further has a bonding portion derived from a monomer having a functional group, and
in the bonding portion, there is a siloxane-based compound formed of a block copolymer linked with the base particles by reacting the functional group and the hydroxyl group.
4. The electrophoresis dispersion liquid according to claim 3,
wherein a weight average molecular weight of the dispersion portion is 15,000 or more to 150,000 or less.
5. The electrophoresis dispersion liquid according to claim 3,
wherein, in the dispersion portion, a number of units derived from the silicone macromonomer is one.
6. An electrophoresis dispersion liquid comprising:
first electrophoretic particles;
second electrophoretic particles with a smaller particle diameter than the first electrophoretic particles; and
a dispersion medium,
wherein,
in the electrophoresis dispersion liquid, a total content of the first electrophoretic particles and the second electrophoretic particles is 10 weight % or more to 30 weight % or less,
the first electrophoretic particles have first base particles and a first particle surface treatment agent linked with the first base particles,
a content of the first particle surface treatment agent in the first electrophoretic particles is 5 weight % or more to less than 10 weight %,
the second electrophoretic particles have second base particles and a second particle surface treatment agent linked with the second base particles, and
a content of the second particle surface treatment agent in the second electrophoretic particles is 10 weight % or more to 15 weight % or less.

7. The electrophoresis dispersion liquid according to claim 6, wherein
an average particle diameter of the first base particles is 200 nm or more to 400 nm or less, and
an average particle diameter of the second base particles is 50 nm or more to less than 200 nm.

8. The electrophoresis dispersion liquid according to claim 6,
wherein the first electrophoretic particles are charged positively and the second electrophoretic particles are charged negatively.

9. The electrophoresis dispersion liquid according to claim 6,
wherein the first electrophoretic particles are white particles and the second electrophoretic particles are colored particles.

10. The electrophoresis dispersion liquid according to claim 6,
wherein, in the electrophoresis dispersion liquid, when content of the first electrophoretic particles is set as A "weight %" and content of the second electrophoretic particles is set as B "weight %", a ratio A/B of the content A and the content B satisfies a relationship of 10 or more to 20 or less.

11. An electrophoresis sheet comprising:
a substrate; and
a structural body which is provided on the substrate and which stores the electrophoresis dispersion liquid according to claim 1.

12. An electrophoresis sheet comprising:
a substrate; and
a structural body which is provided on the substrate and which stores the electrophoresis dispersion liquid according to claim 2.

13. An electrophoresis sheet comprising:
a substrate; and
a structural body which is provided on the substrate and which stores the electrophoresis dispersion liquid according to claim 3.

14. An electrophoresis sheet comprising:
a substrate; and
a structural body which is provided on the substrate and which stores the electrophoresis dispersion liquid according to claim 4.

15. An electrophoresis sheet comprising:
a substrate; and
a structural body which is provided on the substrate and which stores the electrophoresis dispersion liquid according to claim 5.

16. An electrophoresis sheet comprising:
a substrate; and
a structural body which is provided on the substrate and which stores the electrophoresis dispersion liquid according to claim 6.

17. An electrophoresis sheet comprising:
a substrate; and
a structural body which is provided on the substrate and which stores the electrophoresis dispersion liquid according to claim 7.

18. An electrophoresis sheet comprising:
a substrate; and
a structural body which is provided on the substrate and which stores the electrophoresis dispersion liquid according to claim 8.

19. An electrophoresis device comprising:
the electrophoresis sheet according to claim 11.

20. An electronic apparatus comprising:
the electrophoresis device according to claim 19.

* * * * *